(12) United States Patent
Sugita et al.

(10) Patent No.: US 8,592,076 B2
(45) Date of Patent: Nov. 26, 2013

(54) BATTERY PACK

(75) Inventors: Yasunari Sugita, Osaka (JP); Tomohiko Yokoyama, Osaka (JP); Keisuke Shimizu, Osaka (JP); Masato Fujikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 118 days.

(21) Appl. No.: 13/257,500

(22) PCT Filed: Mar. 9, 2011

(86) PCT No.: PCT/JP2011/001386
§ 371 (c)(1),
(2), (4) Date: Sep. 19, 2011

(87) PCT Pub. No.: WO2011/121901
PCT Pub. Date: Oct. 6, 2011

(65) Prior Publication Data
US 2012/0028107 A1    Feb. 2, 2012

(30) Foreign Application Priority Data
Mar. 30, 2010    (JP) .................................. 2010-076585

(51) Int. Cl.
*H01M 2/10*    (2006.01)

(52) U.S. Cl.
USPC ............ 429/149; 429/156; 429/159; 429/185

(58) Field of Classification Search
USPC ......... 429/149, 153, 163, 176, 175, 174, 177, 429/99, 156, 185
See application file for complete search history.

(56) References Cited

U.S. PATENT DOCUMENTS

| | | | |
|---|---|---|---|
| 3,711,332 A | * | 1/1973 | Bastacky ...................... 429/136 |
| 2008/0220320 A1 | | 9/2008 | Horikoshi et al. |
| 2008/0292950 A1 | | 11/2008 | Maeda et al. |
| 2010/0183910 A1 | | 7/2010 | Nishino et al. |
| 2011/0091751 A1 | | 4/2011 | Horikoshi et al. |
| 2011/0165454 A1* | | 7/2011 | Iwamoto et al. ............. 429/163 |

FOREIGN PATENT DOCUMENTS

| | | | | |
|---|---|---|---|---|
| CN | 2702452 Y | | 5/2005 | |
| EP | 2 328 202 A1 | | 6/2011 | |
| GB | 2046502 | * | 11/1980 | ............ H01M 10/39 |
| JP | 02-169234 | | 6/1990 | |
| JP | 08-131571 | | 5/1996 | |

(Continued)

OTHER PUBLICATIONS

Chinese Office Action and Search Report issued in Patent Application No. 201180001439.0 with Date of mailing Jul. 26, 2013.

*Primary Examiner* — Raymond Alejandro
(74) *Attorney, Agent, or Firm* — McDermott Will & Emery LLP

(57) ABSTRACT

A battery pack includes: a plurality of batteries; a housing for containing the batteries; and at least one partition plate for separating the batteries from one another. The at least one partition plate includes a metal mesh and a heat insulating layer disposed on each side of the metal mesh. The heat insulating layer includes a foam material capable of foaming at a temperature of 110° C. or more and 200° C. or less, so that the thickness of the heat insulating layer increases when the foam material foams. Even when one of the batteries contained in the battery pack generates abnormal heat, the conduction of the heat to other batteries can be effectively suppressed.

9 Claims, 1 Drawing Sheet

(56) References Cited

FOREIGN PATENT DOCUMENTS

| JP | 3408676 | * | 5/2003 | ............. C08K 5/521 |
| --- | --- | --- | --- | --- |
| JP | 2005-317455 | | 11/2005 | |
| JP | 2008-192570 | | 8/2008 | |
| JP | 2008-218210 | | 9/2008 | |
| JP | 2009-004362 | | 1/2009 | |
| JP | 2009-021223 | | 1/2009 | |
| JP | 2010-062093 | | 3/2010 | |
| WO | WO 2010/026731 A1 | | 3/2010 | |

* cited by examiner

BATTERY PACK

RELATED APPLICATIONS

This application is the U.S. National Phase under 35 U.S.C. §371 of International Application No. PCT/JP2011/001386, filed on Mar. 9, 2011, which in turn claims the benefit of Japanese Application No. 2010-076585, filed on Mar. 30, 2010, the disclosures of which applications are incorporated by reference herein.

TECHNICAL FIELD

This invention relates to a battery pack including a plurality of batteries, and particularly to an improvement in the structure of a battery pack.

BACKGROUND ART

Recently, portable appliances such as notebook personal computers and cellular phones have become widely used, and there is thus an increasing demand for batteries as the power source for portable appliances. In particular, there is an increasing demand for secondary batteries that are small and light-weight, have high energy density, and can be repeatedly charged and discharged.

To meet such demand, non-aqueous electrolyte secondary batteries are under active research and development. Since non-aqueous electrolyte secondary batteries contain large energy due to an increase in the functionality of portable appliances, they generate large amounts of heat in the event of abnormal conditions.

Thus, proposals have been made on the structure of a battery pack containing such batteries, in order to suppress the conduction of abnormal heat, generated by a specific battery due to some reason, to adjacent batteries.

PTL 1 proposes disposing a partition plate with electrical and thermal insulating properties, made of a resin such as polypropylene or polycarbonate, between a plurality of batteries. The partition plate suppresses the conduction of heat of a specific battery generating abnormal heat to adjacent batteries.

In order to make the partition plate more flame-retardant, PTL 2 proposes using inorganic refractory materials such as mica and ceramics.

PTL 3 proposes forming a cavity in a partition plate made of an inflammable resin such as polyethylene or polypropylene and filling the cavity with a fire-extinguishing agent such as ammonium dihydrogen phosphate. In the event of abnormal heat generation of a battery, a part (a part with a low melting point) of the partition plate melts due to the heat, so that an opening is formed in the partition plate. The fire-extinguishing agent then flows out of the opening, and the empty cavity of the partition plate provides heat insulation.

CITATION LIST

Patent Literature

PTL 1: Japanese Laid-Open Patent Publication No. 2008-192570
PTL 2: Japanese Laid-Open Patent Publication No. 2008-218210
PTL 3: Japanese Laid-Open Patent Publication No. 2009-4362

SUMMARY OF INVENTION

Technical Problem

The partition plates of PTLs 1 to 3 need to be somewhat thick upon battery pack production, thereby resulting in low volumetric efficiency. It is thus difficult to reduce the size of the battery packs.

Also, when a large amount of heat resulting from abnormal heat generation of a specific battery in a battery pack is concentrated in a specific part of a partition plate, the partition plate may be damaged and the heat may be transferred to adjacent batteries.

As such, the invention provides a highly safe, small, and light-weight battery pack with a high heat insulation effect, so that even when a large amount of heat is generated in a specific part of the battery pack due to abnormal heat generation of one of batteries contained in the battery pack, the conduction of the heat to other batteries can be effectively suppressed.

Solution to Problem

The invention is directed to a battery pack including: a plurality of batteries; a housing for containing the batteries; and at least one partition plate for separating the batteries from one another. The at least one partition plate includes a metal mesh and a heat insulating layer disposed on each side of the metal mesh. The heat insulating layer includes a foam material capable of foaming at a temperature of 110° C. or more and 200° C. or less, so that the thickness of the heat insulating layer increases when the foam material foams.

Advantageous Effects of Invention

According to the invention, when the partition plate comprising the heat insulating layers disposed on both sides of the metal mesh is heated, the foam material in the heat insulating layers foams, thereby producing a large number of gas bubbles. As a result, the heat insulating layers expand, and the partition plate exhibits good heat insulation. Since the partition plate includes the metal mesh, the partition plate allows the heat to be dispersed efficiently. Therefore, by disposing the partition plate between adjacent batteries, even when a large amount of heat is generated in a specific part of the battery pack due to abnormal heat generation of one of batteries contained in the battery pack, the conduction of the heat to other batteries can be effectively suppressed. Also, since the heat insulating layers are stably held by the metal mesh, the thickness of the partition plate can be reduced. The use of such a partition plate can provide a highly safe, small, and light-weight battery pack with a high heat insulation effect.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
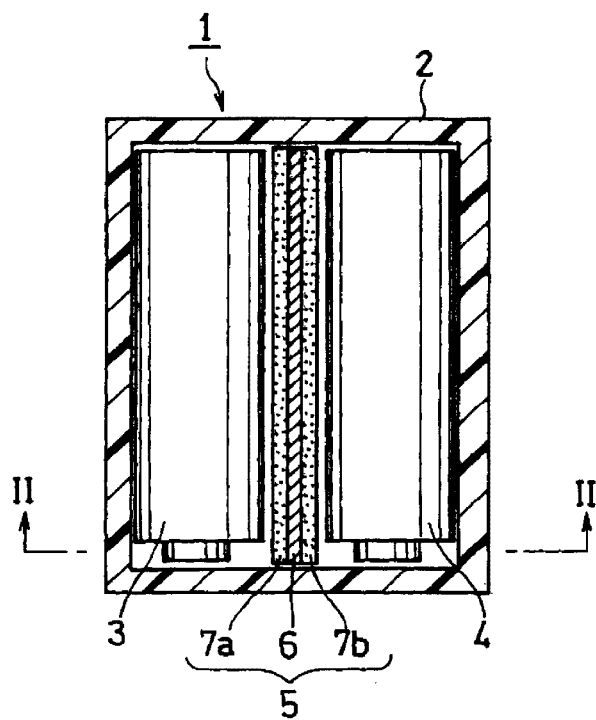
FIG. 1 is a schematic longitudinal sectional view of a battery pack in one embodiment of the invention.

The invention relates to a battery pack including a plurality of (two or more) batteries, a housing for containing the batteries, and at least one partition plate for separating the batteries from one another.

When a plurality of tubular batteries are placed in a housing in such a manner that the side faces of the adjacent batteries face one another, the at least one partition plate is disposed between at least the side faces of the adjacent batteries.

The tubular batteries can be, for example, cylindrical or prismatic. A cylindrical battery or a prismatic battery is in the form of a cylinder or a quadrangular prism having a positive terminal at one end face and a negative terminal at the other end face. When a plurality of cylindrical or prismatic batteries are aligned side by side in such a manner that the side faces of the adjacent batteries face one another, a partition plate is disposed between the side faces. When the end faces of adjacent batteries face one another, a partition plate may or may not be disposed between the end faces.

In the invention, the partition plate has the following features (1) to (3).

(1) The partition plate comprises a heat conductive layer and a heat insulating layer disposed on each side of the heat conductive layer.

(2) The heat conductive layer is a metal mesh.

(3) Each heat insulating layer includes a foam material capable of foaming at a temperature of 110° C. or more and 200° C. or less (hereinafter "first temperature"), and the thickness of the heat insulating layer increases when the foam material foams.

The partition plate included in the battery pack of the invention combines a metal mesh and heat insulating layers containing a foam material, thereby making it possible to diffuse and absorb heat effectively with good balance and improve the safety of the battery pack significantly. Specifically, heat is effectively absorbed by the two heat insulating layers, and heat is effectively dispersed by the metal mesh. As a result, the conduction of heat of a battery generating abnormal heat to adjacent batteries can be suppressed. Even when a large amount of heat is concentrated in a specific part of the partition plate, the partition plate is not damaged, and the conduction of the heat to adjacent batteries can be suppressed reliably.

The heat insulating layer includes a material that foams at the first temperature. As used herein, the first temperature refers to the temperature of the heat insulating layer heated when a battery generates abnormal heat. In view of the ambient environment of battery packs and the temperatures of batteries in the event of abnormal heat generation, it is necessary to use a foam material capable of foaming at 110° C. or more. Silicates of alkali metals, which will be described below, foam at temperatures of 110° C. or more and less than 200° C. In order to make the temperature of the heat insulating layer equal to or lower than the temperature of the battery generating heat, the first temperature is preferably 150° C. or less.

In normal conditions, since the foam material does not foam, the heat insulating layer does not expand, thus being a thin layer. In the event that one of the batteries contained in the battery pack generates abnormal heat, the heat insulating layer in contact with or adjacent to that battery is heated, so that the foam material foams. As a result, a large number of gas bubbles are produced in the heat insulating layer, and the thickness of the heat insulating layer increases. The large number of gas bubbles provides good heat insulation, thereby making it possible to effectively suppress the conduction of the heat to adjacent normal batteries.

Even when a large amount of heat is concentrated in a specific part of the partition plate, as in the case of ejection of hot gas from a battery generating abnormal heat, the heat can be efficiently dispersed by the metal mesh, and thus the partition plate is not damaged.

Since the heat conductive layer is a mesh, heat can be efficiently dispersed by the partition plate, and concentration of heat in a specific part can be effectively suppressed by the partition plate.

Since the heat conductive layer is a metal mesh and the heat insulating layers are stably held by the metal mesh, the partition plate can be made thin. It is thus possible to reduce the size and weight of the battery pack.

The partition plate comprising the metal mesh and the heat insulating layers including the foam material is generally inexpensive, light-weight, and easy to produce, compared with partition plates composed mainly of inorganic refractory materials such as mica and ceramics, thereby making it possible to reduce the weight and cost of the battery pack with a high heat insulation effect.

Also, according to the invention, a foam material is used as a material of the heat insulating layer. Thus, even in the case of using an inorganic refractory material, the use of only a small amount of the inorganic refractory material can provide a sufficient heat insulation effect.

An embodiment of the invention is hereinafter described with reference to drawings, but the invention is not to be construed as being limited to the following embodiment.

Figure 2:
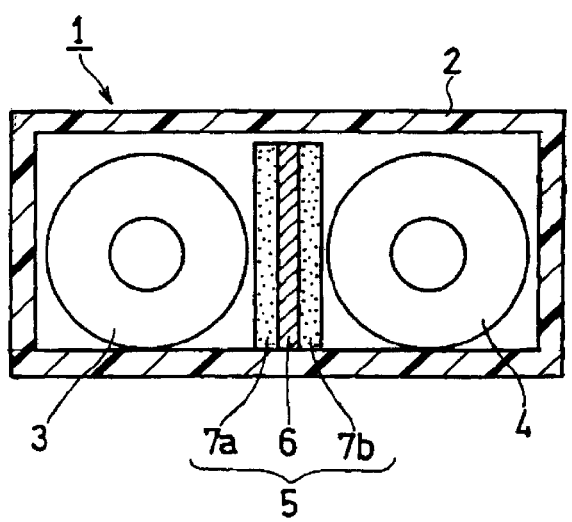
FIG. 2 is a sectional view along the line II-II of FIG. 1.

As illustrated in FIGS. 1 and 2, a battery pack 1 of this embodiment includes a battery 3 and a battery 4, which are cylindrical secondary batteries, a prismatic resin housing 2 for containing the batteries 3 and 4, and a partition plate 5 disposed between the batteries 3 and 4. The partition plate 5 comprises a sheet-like metal mesh 6 and heat insulating layers 7a and 7b disposed on both sides of the metal mesh 6. The heat insulating layer 7a is disposed on the battery 3 side, while the heat insulating layer 7b is disposed on the battery 4 side. Since the heat insulating layers 7a and 7b are disposed on both sides of the metal mesh 6, even if either one of the batteries 3 and 4 generates abnormal heat, the heat can be absorbed efficiently. Besides, the battery pack also includes parts (not shown) necessary for the battery pack, such as parts for electrically connecting the batteries 3 and 4 (e.g., leads) and parts for delivering electricity from the battery pack to outside (e.g., external terminals). These parts may be selected as appropriate from those conventionally used in battery packs.

Each of the batteries 3 and 4 is a cylinder having a positive terminal at one end face thereof and a negative terminal at the other end face. The batteries 3 and 4 are oriented in the same direction, with their side faces facing each other. The partition plate 5 is disposed between the side faces of the batteries 3 and 4. Since the end faces of the batteries 3 and 4 do not face each other, heat conduction is unlikely to occur between the end faces of the batteries 3 and 4.

The metal mesh 6 preferably comprises at least one selected from the group consisting of stainless steel, iron, nickel, aluminum, titanium, and copper. Among them, stainless steel is particularly preferable in terms of the strength of the metal mesh, reduction in the size and weight of the battery pack, and costs.

Even when a large amount of heat is concentrated in a specific part of the partition plate (heat insulating layer), as in the case of ejection of hot gas from a battery generating abnormal heat, the heat can be efficiently absorbed and dispersed. Therefore, the damage of the partition plate 5 due to concentration of a large amount of heat in a specific part can be suppressed.

In terms of the ability of the metal mesh to hold the heat insulating layers and the strength thereof, the metal mesh 6 is preferably of 5 to 65 mesh. The metal mesh is, for example, a wire mesh having a large number of meshes (openings) made of a metal wire. Examples of wire meshes include woven wire meshes such as plain woven wire mesh, twill woven wire mesh, and hexagonal wire mesh. In order to make the heat diffusion of the metal mesh uniform in the plane direction thereof, it is preferable to make the diameter of the wire of the wire mesh uniform and make the shape and size of the meshes uniform. In terms of the heat diffusion and strength of the metal mesh, the diameter of the wire is preferably 0.02 to 0.7 mm. The mesh shape can be polygons such as quadrangles including a square, a rectangle, and a rhombus, and a hexagon (turtleback shape). In terms of the heat diffusion of the metal mesh and the ability of the metal mesh to hold the heat insulating layers, the mesh shape is preferably a quadrangle. In terms of the heat diffusion of the metal mesh and the ability to hold the heat insulating layers, the mesh size (opening) is preferably 0.02 to 4.38 mm. In terms of the heat diffusion of the metal mesh and the ability to hold the heat insulating layers, the open area ratio of the metal mesh is preferably 25 to 75%. Also, expanded metal may be used as the metal mesh.

In the case of using batteries with relatively high capacities, such as non-aqueous electrolyte secondary batteries using negative electrode active materials capable of being alloyed with Li, the battery temperature becomes very high when these batteries generate abnormal heat. When such a battery is used, the metal mesh 6 is preferably formed of a material with a high melting point, such as stainless steel or titanium.

The heat insulating layers 7a and 7b mainly contain a silicate of an alkali metal. The alkali metal is preferably at least one selected from the group consisting of sodium (Na), potassium (K), and lithium (Li), since it is inexpensive and convenient for producing a silicate.

In terms of binding strength, Na>K>Li. In terms of water resistance, Li>K>Na. Silicates of these three alkali metals can be used singly or in combination, depending on the device for which the battery pack is used.

Alkali metal silicates contain large amounts of water of crystallization. Alkali metal silicates containing water of crystallization have a composition represented by, for example, the formula $M_2O.nSiO_2.xH_2O$. In the formula, M is at least one selected from the group consisting of Na, K, and Li. When M is Na or Li, n is 0.5 to 4. When M is K, n is 0.4 to 4. x is a value representing the amount of water of crystallization, and can be any value depending on the amount of water of crystallization. For example, in the case of sodium metasilicate, M=Na and n=1. In the case of potassium metasilicate, M=K and n=1. In the case of lithium metasilicate, M=Li and n=1.

When an alkali metal silicate containing water of crystallization is exposed to a high temperature, the alkali metal silicate starts to release water of crystallization around approximately 110° C., and at the same time, starts to foam. As such, a large number of gas bubbles are produced inside the heat insulating layers 7a and 7b, so that their thicknesses increase to provide improved heat insulation.

For example, in the case of abnormal heat generation of the battery 3 in the battery pack 1, when the heat insulating layers 7a and 7b are heated to the first temperature, the alkali metal silicate in the heat insulating layers 7a and 7b foams, so the heat insulating layers 7a and 7b expand while producing gas bubbles. As a result, the expanded heat insulating layers 7a and 7b containing a large number of the gas bubbles suppress the conduction of the heat from the battery 3 to the adjacent battery 4, thereby preventing the abnormal heat generation of the battery 3 from affecting the battery 4.

The heat of the battery 3 generating abnormal heat is sequentially transferred to the heat insulating layer 7a, the metal mesh 6, and the heat insulating layer 7b. Since the heat transferred to the metal mesh 6 from the heat insulating layer 7a diffuses throughout the partition plate, the heat can be efficiently absorbed by the heat insulating layer 7b. Even when a large amount of heat is transferred to a specific part of the partition plate 5, as in the case of ejection of hot gas from the battery 3 generating abnormal heat, the heat is dispersed in the meal mesh 6, and thus the damage of the partition plate due to concentration of a large amount of heat in the partition plate can be suppressed.

In terms of the space inside the battery pack 1 and the heat insulation of the partition plate 5, the rate of expansion of the heat insulating layers 7a and 7b in the thickness direction is preferably 30 to 600%, and more preferably 50 to 300%.

The expansion rate is represented by the following formula.

Expansion rate (%)=(thickness of heat insulating layer after expansion−thickness of heat insulating layer before expansion)/(thickness of heat insulating layer before expansion)×100

The degree of expansion of the heat insulating layer can be adjusted according to, for example, the kind and content of the foam material and the content of a foam promoter which will be described below. The thickness of the heat insulating layer refers to the thickness in the thickness direction of the partition plate.

Further, the heat insulating layers 7a and 7b also have the effect of cooling the batteries due to latent heat when the alkali metal silicate releases water of crystallization. Therefore, an alkali metal silicate is very preferable as a material of the heat insulating layer. When the foam material is an alkali metal silicate, the cooling effect can be obtained in addition to the heat insulation effect obtained by foaming of the foam material, and thus, the conduction of the heat generated by the battery 3 to the battery 4 can be suppressed more effectively.

Also, since the partition plate 5 is composed mainly of an incombustible material having no ignition point or flash point, it is suitable for enhancing the reliability of the battery pack 1. In the partition plate 5, both sides of the metal mesh are covered with the heat insulating layers having an electrical insulating property, and thus, the partition plate 5 does not cause the batteries to externally short-circuit.

In order to provide more effective heat insulation when the heat insulating layer is heated to a temperature higher than the first temperature at which the alkali metal silicate foams, it is preferable that the heat insulating layers 7a and 7b further contain a foam promoter capable of foaming at a temperature of 200° C. or more (hereinafter "second temperature").

The foam promoter is preferably a material which releases a gas at a temperature higher than the temperature at which the alkali metal silicate foams by releasing water of crystallization which becomes steam. The foam promoter releases a gas when the heat insulating layer is heated to a temperature higher than the first temperature due to abnormal heat generation of a battery. Thus, the amount of gas which contributes to the foaming of the heat insulating layers 7a and 7b increases. Hence, the thickness of the heat insulating layers 7a and 7b after the foam material has foamed can be increased, compared with that of the heat insulating layer containing no foam promoter. As a result, the heat insulation effect of the heat insulating layers 7a and 7b can be further enhanced.

It is more preferable to use, as the foam promoter, at least one selected from the group consisting of aluminum hydroxide, calcium hydroxide, magnesium hydroxide, alum, sodium sulfate, calcium carbonate, magnesium carbonate, and barium carbonate. It is preferable to select, as the form promoter, a material which releases a gas at a temperature (second temperature) higher than the temperature at which the alkali metal silicate foams by releasing water of crystallization which provides a gas.

As a representative combination of a foam material and a foam promoter, a sodium silicate in combination with aluminum hydroxide or magnesium hydroxide is selected. When a sodium silicate is heated to approximately 130 to 150° C., it foams by releasing water of crystallization which becomes steam. On the other hand, when aluminum hydroxide is heated to approximately 200 to 300° C., it is thermally decomposed to produce steam. Also, when magnesium hydroxide is heated to approximately 400° C. or more, it is thermally decomposed to produce steam. With such a combination, when the temperature of the heat insulating layer becomes higher than the temperature at which the sodium silicate releases steam, aluminum hydroxide or magnesium hydroxide, which is a foam promoter, is thermally decomposed to produce steam. Thus, even when the temperature of the heat insulating layer becomes higher than the temperature at which the sodium silicate releases steam, gas bubbles can be continuously produced in the heat insulating layer.

The content Wa of the foam promoter in the heat insulating layers 7a and 7b is preferably 5 to 95 parts by mass, and more preferably 20 to 80 parts by mass, per 100 parts by mass of the alkali metal silicate (excluding water of crystallization).

By setting the content Wa of the foam promoter in the heat insulating layers 7a and 7b to 5 parts by mass or more per 100 parts by mass of the alkali metal silicate (excluding water of crystallization), the foam promoter can produce a sufficient effect. By setting the content Wa of the foam promoter in the heat insulating layers 7a and 7b to 95 parts by mass or less per 100 parts by mass of the alkali metal silicate (excluding water of crystallization), the ratio of the foam material can be made sufficient. Thus, the heat insulating layers 7a and 7b can provide a sufficient heat insulation effect. Also, in the case of using a structural material which will be described below, the ratio of the structural material can be made sufficient, and the adhesion of the heat insulating layers 7a and 7b can be made sufficient. As a result, partial separation of the heat insulating layers 7a and 7b from the metal mesh 6 can be prevented.

To improve the morphological stability of the heat insulating layers in a high-temperature environment, it is preferable that the heat insulating layers 7a and 7b further include a structural material comprising inorganic particles that do not foam at the second temperature. More preferably, the heat insulating layers 7a and 7b include both a foam promoter and a structural material.

The inorganic particles are uniformly dispersed in the heat insulating layer. The inorganic particles are preferably particles of a ceramic in terms of heat resistance and the morphological stability of the heat insulating layer.

It is more preferable to use, as the ceramic, at least one selected from the group consisting of aluminum silicate, sodium silicofluoride, bentonite, monmorillonite, kaolinite, mullite, diatomaceous earth, alumina, silica, mica, titanium oxide, vermiculite, pearlite, Maglite, sepiolite, talc, calcium silicate, magnesium silicate, calcium sulfate, and cement.

The shape of the particles is, for example, a sphere, a flake, or a fiber. When the structural material is in the form of a fiber, it preferably has a mean fiber length of 0.1 to 100 μm and a mean fiber diameter of 0.01 to 10 μm. When the structural material is spherical, it preferably has a mean particle diameter of 0.1 to 100 μm. When the structural material is in the form of a flake, it preferably has, for example, a thickness of 0.01 to 10 μm and a maximum size of 0.05 to 100 μm.

The content Wb of the structural material in the heat insulating layers 7a and 7b is preferably 5 to 70 parts by mass, and more preferably 10 to 50 parts by mass, per 100 parts by mass of the alkali metal silicate (excluding water of crystallization).

By setting the content Wb of the structural material in the heat insulating layers 7a and 7b to 5 parts by mass or more per 100 parts by mass of the alkali metal silicate (excluding water of crystallization), the thicknesses of the heat insulating layers 7a and 7b can be made uniform when the heat insulating layers 7a and 7b expand. Thus, the resulting foam layers (the expanded heat insulating layers) can provide a sufficient heat insulation effect. By setting the content Wb of the structural material in the heat insulating layers 7a and 7b to 50 parts by mass or less per 100 parts by mass of the alkali metal silicate (excluding water of crystallization), the ratios of the foam material and the foam promoter can be made sufficient. Thus, the heat insulating layers 7a and 7b can provide a sufficient heat insulation effect.

Since the metal mesh 6 has a large number of openings (meshes), it allows the size and weight of the battery pack to be reduced. Also, in the production of the partition plate, the openings of the metal mesh 6 are densely filled with a composition for forming heat insulating layers, which will be described below, so that heat insulating layers (not shown) are formed in the openings of the metal mesh 6. The heat insulating layers formed in the openings allow the heat insulating layers 7a and 7b to be integrated. Thus, the heat insulating layers 7a and 7b are stably held by the metal mesh 6. Separation and fall-off of the heat insulating layers 7a and 7b from the metal mesh 6 are suppressed.

Since the openings of the metal mesh 6 are of uniform shape and size, the heat insulating layers can be uniformly filled in the openings. Therefore, in the plane direction of the partition plate 5, the heat diffusion of the metal mesh and the heat absorption of the heat insulating layers can be made uniform.

Contrary to this, when the heat conductive layer is a porous material (foam), its pores are not of uniform shape and size. The surface of the porous material has a small open area, and some of the pores do not extend in the thickness direction. Also, the ratio of the pores in the porous material is small. Thus, it is difficult to form heat insulating layers in the pores of the porous material densely and stably, and it is difficult to hold the heat insulating layers on the surfaces of the porous material stably. It is difficult to fill the heat insulating layers in the porous material uniformly. Heat diffusion and heat absorption tend to vary in the plane direction of the porous material.

The thickness of the metal mesh 6 is preferably 0.02 mm to 1 mm. The thickness of the metal mesh 6 as used herein refers to the largest thickness in a section along the thickness direction of the metal mesh 6. When the thickness of the metal mesh is 0.02 mm or more, the heat from a battery generating abnormal heat can be effectively absorbed and dispersed. In terms of reducing the size and weight of the battery pack, when the thickness of the metal mesh 6 is 1 mm or less, the size and weight of the battery pack can be readily reduced.

The thickness of the metal mesh 6 is more preferably 0.02 to 0.5 mm, and even more preferably 0.02 to 0.1 mm.

In terms of the morphological stability of the heat insulating layers and reduction in the size and weight of the battery pack, the thickness of the heat insulating layer 7a (the thickness before the foam material foams) and the thickness of the heat insulating layer 7b (the thickness before the foam material foams) are preferably 0.04 to 2 mm, more preferably 0.04 to 1 mm, and even more preferably 0.04 to 0.5 mm.

The thickness of the partition plate 5 is preferably 0.1 to 5 mm. The thickness of the partition plate 5 as used herein refers to the thickness before the foam material foams. When the thickness of the partition plate 5 is 0.1 mm or more, the partition plate 5 can provide sufficient heat insulation. When the thickness of the partition plate 5 is 5 mm or less, the size and weight of the battery pack can be readily reduced. The thickness of the partition plate 5 is preferably 0.1 to 2.5 mm.

The width of the partition plate 5 (in a plane perpendicular to the axial direction of the batteries, the length of the partition plate in the plane direction) is preferably equal to or more than the diameter of the batteries 3 and 4 housed in the battery pack (the height of the batteries from the surface (the inner bottom face of the housing) on which the batteries are placed). In this case, the heat insulation effect of the heat insulating layers 7a and 7b is heightened.

The length of the partition plate 5 in the axial direction of the batteries is preferably equal to or more than the length of the batteries in the axial direction of the batteries. In this case, the heat insulation effect of the heat insulating layers 7a and 7b is heightened.

When prismatic batteries are contained in the housing instead of the cylindrical batteries, the width of the partition plate 5 (in a plane perpendicular to the axial direction of the batteries, the length of the partition plate 5 in the plane direction) is preferably equal to or more than the height of the prismatic batteries from the surface (the inner bottom face of the housing) on which the batteries are placed.

The method for producing the battery pack 1 includes, for example, the steps of:
(A) preparing the housing 2;
(B) preparing a composition containing an alkali metal silicate used to form heat insulating layers;
(C) applying the heat-insulating-layer forming composition prepared in step (B) to both faces of the metal mesh 6 to form layers with a uniform thickness and drying them to form the heat insulating layers 7a and 7b, thereby producing the partition plate 5; and
(D) placing the battery 3, the battery 4, and the partition plate 5 into the housing 2 in such a manner the partition plate 5 is disposed between the battery 3 and the battery 4.

Step (A) is described below.

The housing can be produced by, for example, molding a resin. The resin material used to form the housing is preferably a flame-retarded resin classified as V-0 or higher in UL-94 standard. "A guide to the Safe Use of Lithium Ion Secondary Batteries in Notebook-type Personal Computers" (Japan Electronics Information Industries Association and Battery Association of Japan) recommends the use of such flame-retarded resins as the resin materials for housings. The constituent material of the housing is preferably a polymer material which is rendered flame-retardant. The polymer material is preferably one of polycarbonate (PC), polypropylene (PP), polyethylene terephthalate (PET), etc., which is rendered flame-retardant.

Step (B) is described below.

The composition for forming heat insulating layers can be prepared by, for example, adding a solvent or dispersion medium to an alkali metal silicate. If necessary, at least one of a foam promoter and a structural material may be added to the heat-insulating-layer forming composition. The solvent or dispersion medium can be, for example, water or an organic solvent.

In terms of workability, it is preferable to use liquid glass (an aqueous solution of sodium silicate) as the heat-insulating-layer forming composition. The liquid glass is, for example, sodium silicate Nos. 1 to 3 according to JIS (JIS K 1408).

Step (C) is described below.

For example, the heat-insulating-layer forming composition is applied onto the metal mesh 6 to form coatings, and the coatings are dried to remove the solvent or dispersion medium contained in the coatings, in order to form the heat insulating layers 7a and 7b on the metal mesh 6. For example, when liquid glass is used as the heat-insulating-layer forming composition, it is possible to form heat insulating layers including solid sodium silicate containing water of crystallization.

The heat-insulating-layer forming composition can be applied by a known coating method such as immersion coating, roller coating, spraying coating, or doctor blade coating.

In step (C), the composition can be easily filled into the openings of the metal mesh in addition to both sides of the metal mesh. It is thus possible to not only form the heat insulating layers 7a and 7b on both sides of the metal mesh 6 but also form heat insulating layers (not shown) in the openings of the metal mesh 6 easily. As such, the heat insulating layers 7a and 7b can be firmly held by the metal mesh 6.

Step (D) is described below.

In step (D), for example, when the housing 2 prepared in step (A) comprises a case body and a cover, the batteries 3 and 4 are placed in the case body from the opening of the case body, the partition plate 5 is inserted between the batteries 3 and 4, and the cover is attached to the case body with adhesive or thermal welding. In this manner, the battery 3, the battery 4, and the partition plate 5 are placed in the housing 2.

Also, when a groove for receiving an end of the partition plate is formed in a predetermined part of the inner face of the case body in step (A), the end of the partition plate may be fitted to the groove in advance to place the partition plate in the predetermined position of the case body before step (D) of placing the batteries in the case body.

EXAMPLES

Examples of the invention are hereinafter described in details, but the invention is not to be construed as being limited to these Examples.

To evaluate the safety of the battery pack of the invention, evaluation packs were produced for evaluation by using metal cylinders instead of batteries in the following manner.

Example 1

(1) Preparation of Partition Plate

A composition for forming heat insulating layers was evenly applied onto both sides of a nickel mesh (available from Nilaco Corporation, nickel/wire mesh, 20 mesh, part number NI-318020) having a length of 65 mm, a width of 20 mm, and a thickness of 0.4 mm, and left for a whole day and night for natural drying to form heat insulating layers (the thickness of each layer 0.3 mm) comprising sodium silicate containing water of crystallization. In this manner, a partition plate A (thickness 1.0 mm) was prepared. The heat-insulating-layer forming composition was an aqueous solution of sodium silicate prepared by mixing 80 parts by mass of silicate of soda (available from Osaka Keisou Co., Ltd., trade name: silicate of soda, No. 3) and 20 parts by mass of water. The $Na_2O:SiO_2$ molar ratio was 1:3.

(2) Production of Evaluation Pack

Instead of the batteries 3 and 4, two cylinders (length 65 mm and outer diameter 18 mm) made of SUS 304 were placed in a polycarbonate housing whose internal space had a length of 67 mm, a width of 41 mm, a depth of 20 mm, and a thickness of 1 mm. The partition plate A obtained in the above manner was disposed between the cylinders in the housing.

Specifically, the housing was composed of a prismatic case body with a bottom and a quadrangular cover plate. The two cylinders were placed in the case body, and the partition plate was inserted between the two cylinders. Thereafter, the case body was fitted with the cover plate. In this manner, the partition plate and the two cylinders were placed in the housing. It should be noted that for an evaluation test described below, a battery pack was produced without joining the case body and the cover plate.

Example 2

Accera coat F (composed mainly of silicate of soda and containing a structural material and the like) available from Access Co., Ltd. was applied onto both sides of a stainless steel mesh (available from Nilaco Corporation, stainless SUS304/wire mesh, 30 mesh, part number NI-758030) having a length of 65 mm, a width of 20 mm, and a thickness of 0.25 mm, and left for a whole day and night for natural drying to form heat insulating layers (the thickness of each layer 0.3 mm) comprising sodium silicate containing water of crystallization. In this manner, a partition plate B (thickness 0.85 mm) was prepared. The $Na_2O:SiO_2$ molar ratio was 1:3.2.

An evaluation pack was produced in the same manner as in Example 1 except for the use of the partition plate B in place of the partition plate A.

Comparative Example 1

A polycarbonate (PC) plate (length 65 mm, width 20 mm, thickness 1 mm) was prepared as a partition plate C.

An evaluation pack was produced in the same manner as in Example 1 except for the use of the partition plate C in place of the partition plate A.

[Evaluation]

Examples 1 to 2 and Comparative Example 1 were evaluated as follows.

A ceramic heater (MS-M5 available from SAKAGUCHI E. H. VOC CORP.) was prepared. The cover was detached from the housing, and a plate-like heat generator of the ceramic heater was brought into contact with one end face of one of the cylinders, and a pair of lead wires extending from the heat generator was connected to a power source having an inter-terminal voltage of 6 V. The temperature of the heater was set to 700° C. After ten minutes from the time when the temperature of the heater reached 700° C., the temperature of the other cylinder was measured with a thermocouple.

Also, with respect to Examples 1 and 2, the thickness of the heat insulating layers before expansion due to heating by the heater and the thickness of the heat insulating layers after expansion due to heating by the heater were measured using a digital vernier scale. The expansion rate was calculated from the following formula.

Expansion rate (%)=(thickness of heat insulating layer after expansion−thickness of heat insulating layer before expansion)/(thickness of heat insulating layer before expansion)×100

Table 1 shows the results. In Table 1, "expansion rate of heat insulating layer" is the average value of expansion rates of the two heat insulating layers disposed on both sides of the metal mesh.

TABLE 1

|  | Temperature of cylinder (° C.) | Expansion rate of heat insulating layer (%) |
|---|---|---|
| Example 1 | 110 | 110 |
| Example 2 | 106 | 140 |
| Comparative Example 1 | 320 | — |

It has been found that the evaluation packs of Examples 1 and 2 according to the invention are superior in heat insulation effect to the evaluation pack of Comparative Example 1. It has been found that when the partition plates of Examples 1 and 2 are used, the conduction of heat between adjacent batteries is effectively suppressed, thereby resulting in battery packs with very high safety. In the case of the evaluation pack of Comparative Example 1, the partition plate C partially melted and broke. Also, since the partition plate C contains no foam material, it did not expand due to foaming of a foam material, unlike Examples 1 and 2.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The battery pack according to the invention is useful as the battery pack for personal computers, cellular phones, etc., since the conduction of heat generated by a specific battery due to an abnormal condition to adjacent batteries can be effectively suppressed. It is also applicable to packages for large, stationary batteries, electric vehicle batteries, etc.

The invention claimed is:

1. A battery pack comprising:

a plurality of batteries;

a housing for containing the batteries; and at least one partition plate for separating the batteries from one another, wherein the at least one partition plate includes a metal mesh and a heat insulating layer disposed on each side of the metal mesh, the at least one partition plate is disposed between facing parts of adjacent batteries of the plurality of batteries, the heat insulating layer includes a foam material capable of foaming at a temperature selected from a range of 110° C. or more and less than 200° C., so that the thickness of the heat insulating layer increases when the foam material foams, the foam material comprises a silicate of an alkali metal containing water of crystallization, and the heat insulating layer is in an unexpanded state under normal operating conditions.

2. The battery pack in accordance with claim 1, wherein the alkali metal is at least one selected from the group consisting of sodium, potassium, and lithium.

3. The battery pack in accordance with claim 1, wherein the heat insulating layer further includes: a foam promoter capable of foaming at a temperature of 200° C. or more; and a structural material comprising inorganic particles that do not foam at the temperature of 200° C. or more.

4. The battery pack in accordance with claim 3, wherein the foam promoter is at least one selected from the group consisting of aluminum hydroxide, calcium hydroxide, magnesium hydroxide, alum, sodium sulfate, calcium carbonate, magnesium carbonate, and barium carbonate.

5. The battery pack in accordance with claim 3, wherein the structural material is at least one selected from the group consisting of aluminum silicate, sodium silicofluoride, bentonite, monmorillonite, kaolinite, mullite, diatomaceous earth, alumina, silica, mica, titanium oxide, vermiculite, pearlite, maglite, sepiolite, talc, calcium silicate, magnesium silicate, calcium sulfate, and cement.

6. The battery pack in accordance with claim 1, wherein the metal mesh comprises at least one selected from the group consisting of stainless steel, iron, nickel, aluminum, titanium, and copper.

7. The battery pack in accordance with claim 1, wherein the metal mesh has a thickness of 0.02 mm to 1 mm.

8. The battery pack in accordance with claim 1, wherein the partition plate has a thickness of 0.1 mm to 5 mm before the foam material foams.

9. The battery pack in accordance with claim 3, wherein the structural material comprises at least one selected from the group consisting of aluminum silicate, sodium silicofluoride, bentonite, monmorillonite, kaolinite, mullite, diatomaceous earth, alumina, silica, mica, titanium oxide, vermiculite, pearlite, maglite, sepiolite, talc, calcium silicate, magnesium silicate, and calcium sulfate.

* * * * *

UNITED STATES PATENT AND TRADEMARK OFFICE
CERTIFICATE OF CORRECTION

| | |
|---|---|
| PATENT NO. | : 8,592,076 B2 |
| APPLICATION NO. | : 13/257500 |
| DATED | : November 26, 2013 |
| INVENTOR(S) | : Yasunari Sugita et al. |

It is certified that error appears in the above-identified patent and that said Letters Patent is hereby corrected as shown below:

On the Title page, Item (54) and in the Specification, column 1, line 1, Title should read \*\* -- BATTERY PACK INCLUDING A PARTITION PLATE HAVING A
HEAT INSULATING LAYER -- \*\*

Signed and Sealed this
Eighth Day of April, 2014

Michelle K. Lee
*Deputy Director of the United States Patent and Trademark Office*